United States Patent [19]

Turgay

[11] Patent Number: 4,948,518
[45] Date of Patent: Aug. 14, 1990

[54] METHOD OF SEPARATING A SUSPENSION OF ACTIVATED SLUDGE AND SEWAGE WATER

[75] Inventor: Hüdai Turgay, Berlin, Fed. Rep. of Germany

[73] Assignee: Borsig GmbH, Berlin, Fed. Rep. of Germany

[21] Appl. No.: 330,598

[22] Filed: Mar. 29, 1989

[30] Foreign Application Priority Data

Apr. 16, 1988 [DE] Fed. Rep. of Germany ....... 3812715

[51] Int. Cl.$^5$ ...................... B01D 21/06; B01D 21/24
[52] U.S. Cl. .................... 210/802; 210/803; 210/520; 210/521; 210/523
[58] Field of Search ............... 210/519, 520, 521, 523, 210/528, 534, 532.1, 801, 802, 803

[56] References Cited

U.S. PATENT DOCUMENTS

| 1,123,011 | 12/1914 | Ripley | 210/534 |
| 2,405,158 | 8/1946 | Mensing | 210/532.1 |
| 2,678,914 | 5/1954 | Kalinske | 210/520 |
| 2,713,026 | 7/1955 | Kelly et al. | 210/528 |
| 3,338,827 | 8/1967 | Mausolf | 210/523 |
| 3,353,676 | 11/1967 | Hirsch | 210/528 |
| 3,397,788 | 8/1968 | Duff et al. | 210/528 |
| 3,473,661 | 10/1969 | Duff | 210/528 |
| 3,487,017 | 12/1969 | Thorn | 210/520 |
| 3,951,816 | 4/1976 | Bascope et al. | 210/519 |

FOREIGN PATENT DOCUMENTS 516439 12/1930 Fed. Rep. of Germany.

Primary Examiner—Richard V. Fisher
Assistant Examiner—Christopher Upton
Attorney, Agent, or Firm—Max Fogiel

[57] ABSTRACT

A sedimentation tank for separating activated sludge from a suspension of activated sludge and sewage water, with an intake (11) for the suspension, an outlet (3) for the activated sludge at the conical bottom, and a discharge (4) at the top for the sewage water that the activated sludge has been eliminated from. A pipe (7) that is open at the top and closed at the bottom by a floor (9) is accommodated at the center of the tank and an inlet (10) that communicates with the intake opens into the pipe in the vicinity of the floor. The central pipe extends above the surface (20) of the liquid in the tank, which is dictated by how much is leaving, is loosely surrounded by another pipe (8) that extends above and below the surface of the liquid, and accommodates an agitator (12) with a speed that can be set to shape the suspension at the top of the pipe into a paraboloid (21) of rotation, which extends to the edge and from which the suspension spills over the edge.

4 Claims, 1 Drawing Sheet

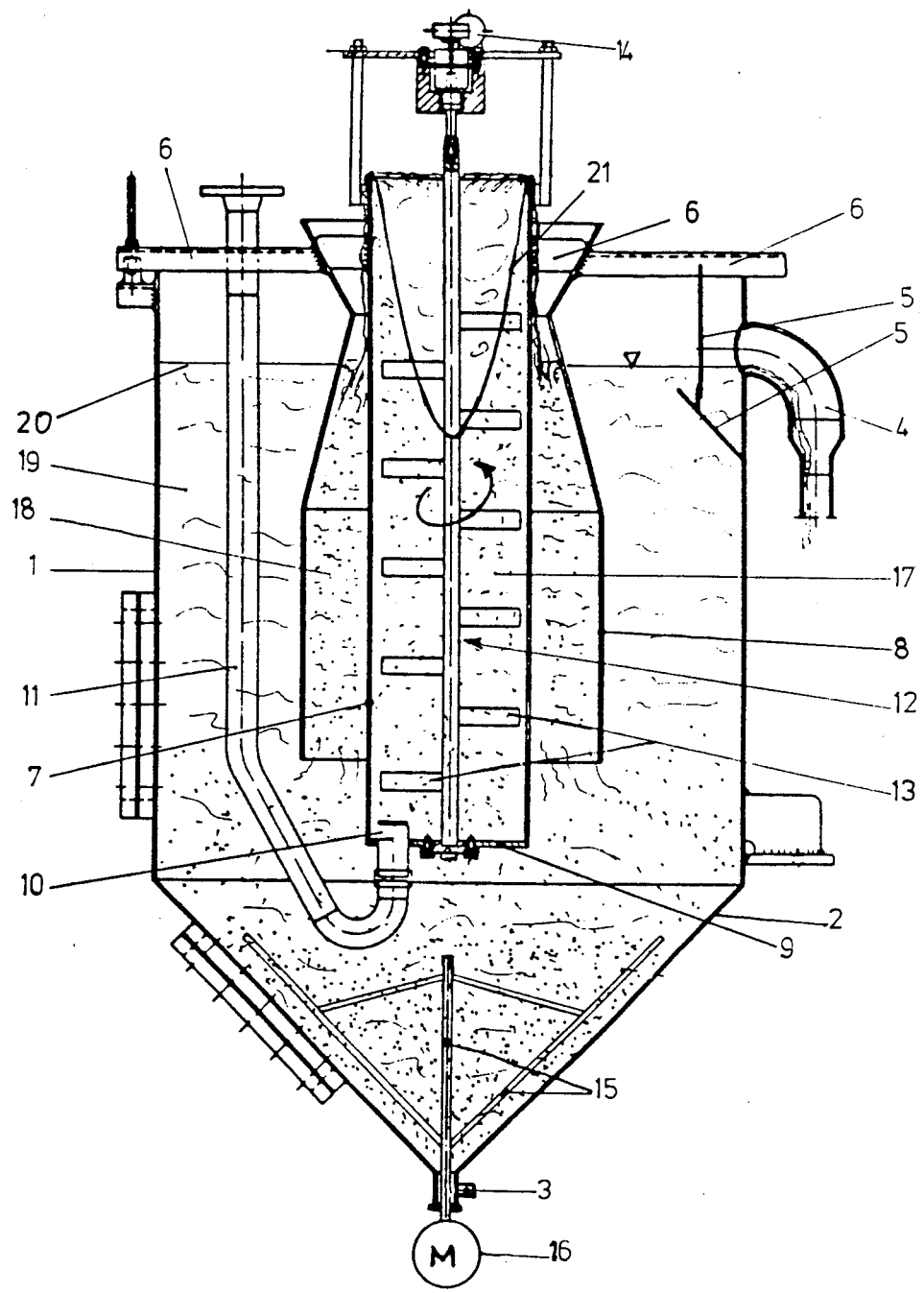

METHOD OF SEPARATING A SUSPENSION OF ACTIVATED SLUDGE AND SEWAGE WATER

The invention concerns a sedimentation tank for separating activated sludge from a suspension of activated sludge and sewage water, with an intake for the suspension, an outlet for the activated sludge at the conical bottom, and a discharge at the top for the sewage water that the activated sludge has been eliminated from, whereby a pipe that is open at the top and closed at the bottom by a floor is accommodated at the center of the tank and whereby an inlet that communicates with the intake opens into the pipe in the vicinity of the floor.

The sedimentation tank can be part of the type of plant for treating sewage water with activated sludge by adding oxygen as described in German Patent Application No. 3 151 153. The sludge must be removed in the sedimentation tank from the suspension of sewage water and activated sludge that has been treated in a reactor.

A device of this genus is known from German Pat. No. 516 439. It is employed to separate precipitated and suspended matter and gases from liquids. The contaminated liquid is rotated in this sedimentation and separation tank by being conveyed tangentially into a central pipe below the surface of the liquid. The gases, foam, and lighter-weight suspended matter are forced to the center of the pipe and rise up through it. The water with the heavier suspended matter spirals up along the inner surface of the pipe and enters the actual precipitation area over the pipe's edge. The known device is not designed to effectively separate the activated sludge from a suspension of sludge and sewage water. The gases released in the central pipe below the surface of the liquid must ascend against the force of the column of liquid on top of the pipe. The gases are likely to be captured by clumps of bacteria and join them in creating a suspended sludge that is very difficult to separate. If, again, the suspension is set rotating just because it enters the pipe at a tangent, a minimum inflow speed that depends on the volume entering must not be exceeded. If too little material is entering, the activated sludge will collect at the bottom of the pipe and clog it up.

The object of the invention is to improve the generic sedimentation tank to the extent that the activated sludge can be effectively separated in a small space.

This object is attained in accordance with the invention in a generic sedimentation tank in that the central pipe extends above the surface of the liquid in the tank, which is dictated by how much is leaving, is loosely surrounded by another pipe that extends above and below the surface of the liquid, and accommodates an agitator with a speed that can be set to shape the suspension at the top of the pipe into a paraboloid of rotation, which extends to the edge and from which the suspension spills over the edge. In one advantageous embodiment of the invention, the central pipe, the pipe that surrounds it, and the jacket of the tank that surrounds the outer pipe demarcate spaces that the material flows through sequentially, vertically, and in opposite directions and that are arrayed such that they increase in size in the order in which the matter flows through them. Another agitator can be accommodated in the conical section of the sedimentation tank.

The agitator in the sedimentation tank in accordance with the invention hurls the suspension outward, breaking up any clumps of bacteria into smaller clumps. The bubbles of gas trapped by the clumps of bacteria are released and ascend along a phase interface created between the suspension and the outer atmosphere by the surface of the paraboloid of rotation. The bubbles do not have far to rise through the liquid in order to arrive at the phase interface, and the suspension of activated sludge and sewage water will be almost completely free of gas as it leaves the central pipe. Once the suspension has left the central pipe, the bacteria will again be in clumps, which, however, will be larger than the original clumps and almost free of gas bubbles, powerfully accelerating the sedimentation of the activated sludge and its separation from the water. Because of this accelerated separation, the sedimentation tank can be comparatively small. Since the rotation of the suspension is governed by an external mechanism in the form of the agitator, it can be established independently of the throughput and in accordance with the viscosity of the suspension.

One embodiment will now be described with reference to the drawing, which is a longitudinal section through a sedimentation tank.

The sedimentation tank has a preferably cylindrical jacket 1. The bottom of the jacket is a cone 2 that terminates in an outlet 3. At the top of jacket 1 is a discharge 4. In front of the discharge is a solids filter 5. The surface 20 of the liquid in the tank becomes established at the same level as discharge 4.

Accommodated at the center of the tank is a pipe 7 that is open at the top and closed at the bottom by a floor 9 just above cone 2. Directly above floor 9, an inlet 10 opens into central pipe 7. The cross-section of inlet 10 is smaller than that of central pipe 7. Inlet 10 communicates with an intake 11 that extends through the inside of the tank. The upper and open end of central pipe 7 extends beyond the surface 20 of the liquid and accordingly communicates with the outer atmosphere.

Central pipe 7 is loosely enough surrounded by another pipe 8 that the cross-section of the annular space 18 between pipes 7 and 8 is larger than that of central pipe 7. The upper end of outer pipe 8 extends above the surface 20 of the liquid and its lower end is below the surface in the vicinity of cone 2. Pipes 7 and 8 are secured to jacket 1 by three struts 6.

Accommodated in central pipe 7 is an agitator 12 that consists of an upright shaft with blades 13 mounted on it. The shaft extends out of the top of central pipe 7 and is coupled to a motor 14. The speed of agitator 12 can be varied in accordance with the viscosity of the suspension in central pipe 7. The speed is set to shape the suspension at the top of central pipe 7 into a paraboloid 21 of rotation approximately 1 meter high. The suspension leaves the paraboloid over the upper edge of central pipe 7.

Cone 2 accommodates another agitator 15 that is driven by a separate motor 16.

The sewage water is treated with activated sludge by adding oxygen in an unillustrated reactor of the type described in German Patent Application No. 3 151 153 while constantly being mixed with perforated plates that travel up and down. A suspension of activated sludge and sewage water leaves the reactor and arrives in the sedimentation tank described herein through intake 11. The suspension enters central pipe 7 tangentially at the lowest point through inlet 10. Central pipe 7 demarcates the first space that the suspension will travel through, which functions as a degasser and decompressor 17. Agitator 12 hurls the suspension against the inner surface of central pipe 7, creating paraboloid 21 of rotation at the top. The centrifugal force breaks up the clumps of bacteria in the activated sludge and releases the gases trapped in them. These gases bubble up along the phase interface represented by the surface of paraboloid 21 of rotation. An extensively degassed suspension spills over the upper edge of central pipe 7 and arrives in the annular space 18 between pipes 7 and 8, through which it flows downward. At this point the bacteria form new clumps, which are, however, larger than the original clumps and extensively free of gas. Since the clumps of bacteria are now heavier, they tend to drop down more rapidly. Once it has left annular space 18, the stream of liquid is diverted, precipitating the activated sludge, which collects in cone 2. The sludge is compacted by second agitator 15 and extracted through outlet 3. The water, from which the sludge has been removed, rises through the space 19 demarcated by outer pipe 8 and jacket 1 and spills out through discharge 4. Since the cross-section of annular space 18 is larger than that of decompressor space 17 and the cross-section of space 19 is larger than that of annular space 18, the flow cross-section available to the suspension as it travels to discharge 4 will constantly increase. The resulting deceleration of the flow of suspension will, in conjunction with the increased weight of the clumps of bacteria, accelerate the sedimentation of the degassed suspension.

I claim:

1. A method for separating activated sludge from a suspension of activated sludge and sewage water comprising: introducing said suspension into a sedimentation tank, said tank comprising: intake means for entry of the suspension into the tank; said tank having a conical bottom and a top; outlet means at said conical bottom for exit of the activated sludge from the tank; discharge means at the top of said tank for discharging sewage water separated from the activated sludge; first pipe means at the center of said tank and having an open top and a closed bottom; base means for closing the bottom of said first pipe means; inlet means communicating with said intake means and said first pipe means at said base means: means for maintaining liquid in said tank at a level dependent on amount of liquid leaving the tank, said first pipe means extending above said level; second pipe means surrounding loosely said first pipe means and extending above and below said level of said liquid; and agitator means in said first pipe means; driving said agitator means at a speed for shaping the suspension at the top of said first pipe means into a paraboloid of revolution extending to an edge at the top of said first pipe means, said suspension spilling over said edge; said agitator through said paraboloid producing a maximum border surface between said suspension and outer atmosphere for expelling gas bubbles present in said suspension to leave the suspension and enter the atmosphere, said agitator breaking up clumps of bacteria into smaller clumps for releasing the gas bubbles, said gas bubbles after release ascending along a phase interface between the suspension and outer atmosphere by the surface of said paraboloid, bacteria reuniting into clumps that are larger than the first-mentioned clumps and that are substantially free of gas bubbles after the suspension has left said first pipe means so that sedimentation of the activated sludge and separation from the water is accelerated for reducing the size of said sedimentation tank.

2. A method as defined in claim 1, wherein said tank has a wall surrounding said second pipe means, said wall and said second pipe means defining a first space therebetween; said second pipe means and said first pipe means having interiors defining respectively second and third spaces; said first, second and third spaces being consecutively larger in sequence of flow through said spaces.

3. A method as defined in claim 1, wherein said tank includes additional agitator means in said conical bottom.

4. A method for separating activated sludge from a suspension of activated sludge and sewage water, comprising: introducing said suspension into a sedimentation tank, said tank comprising: intake means for entry of the suspension into the tank; said tank having a conical bottom and a top; outlet means at said conical bottom for exit of the activated sludge from the tank; discharge means at the top of said tank for discharging sewage water separated from the activated sludge; first pipe means at the center of said tank and having an open top and a closed bottom; base means for closing the bottom of said first pipe means; inlet means communicating with said intake means and said first pipe means at said base means; means for maintaining liquid in said tank at a level dependent on amount of liquid leaving the tank, said first pipe means extending above said level; second pipe means surrounding loosely said first pipe means and extending above and below said level of said liquid; and agitator means in said first pipe means; driving said agitator means at a speed for shaping the suspension at the top of said first pipe means into a paraboloid of revolution extending to an edge at the top of said first pipe means, said suspension spilling over said edge: said agitator through said paraboloid producing a maximum border surface between said suspension and outer atmosphere for expelling gas bubbles present in said suspension to leave the suspension and enter the atmosphere, said agitator breaking up clumps of bacteria into smaller clumps for releasing the gas bubbles, said gas bubbles after release ascending along a phase interface between the suspension and outer atmosphere by the surface of said paraboloid, bacteria reuniting into clumps that are larger than the first-mentioned clumps and that are substantially free of gas bubbles after the suspension has left said first pipe means so that sedimentation of the activated sludge and separation from the water is accelerated for reducing the size of said sedimentation tank; said tank having a wall surrounding said second pipe means, said wall and said second pipe means defining a first space therebetween; said second pipe means and said first pipe means having interiors defining respectively second and third spaces; said first, second and third spaces being consecutively larger in sequence of flow through said spaces; and an additional agitator means in said conical bottom.

* * * * *